(12) United States Patent
Lee et al.

(10) Patent No.: US 6,269,441 B1
(45) Date of Patent: *Jul. 31, 2001

(54) LOGO DISPLAY DEVICE FOR A COMPUTER AND THE METHOD THEREOF

(75) Inventors: Gwang-Soo Lee, Seoul; Hyun-Kook Lee, Suwon, both of (KR)

(73) Assignee: SamSung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/150,101

(22) Filed: Sep. 9, 1998

(30) Foreign Application Priority Data

Sep. 9, 1997 (KR) .................................. 97-46286

(51) Int. Cl.[7] ...................................... G06F 9/00
(52) U.S. Cl. ...................................... 713/1; 713/2
(58) Field of Search .................. 713/1, 2, 100; 345/418, 334

(56) References Cited

U.S. PATENT DOCUMENTS

| 5,355,489 | 10/1994 | Bealkowski et al. |
|---|---|---|
| 5,471,674 | 11/1995 | Stewart et al. |
| 5,522,076 | 5/1996 | Dewa et al. |
| 5,600,766 | 2/1997 | Deckys et al. |
| 5,619,639 | 4/1997 | Mast. |
| 5,680,535 * | 10/1997 | Harbin et al. ............ 395/173 |
| 5,762,555 * | 10/1997 | Crump et al. ............ 463/41 |
| 5,802,363 * | 9/1998 | Williams et al. ............ 395/652 |

* cited by examiner

Primary Examiner—Robert Beausoleil
Assistant Examiner—Rita Ziemer
(74) Attorney, Agent, or Firm—Robert E. Bushnell, Esq.

(57) ABSTRACT

The present invention refers to a logo display device for a computer and the method thereof which allows a user to optionally select and display a logo image of a system's basic input output system (BIOS). The present invention comprises: an image exchange tool for changing numerous graphic images made by a user into logo images, respectively; a storage medium for storing the numerous logo images changed by means of the image exchange tool; a basic input output system read only memory (BIOS ROM) for storing default logo images; a logo image selection unit for enabling a user to optionally select a logo image among the logo images stored in the read only memory (ROM) and the storage medium; and a display unit for displaying the logo image selected optionally by the user.

34 Claims, 6 Drawing Sheets

LOGO DISPLAY DEVICE FOR A COMPUTER AND THE METHOD THEREOF

CLAIM OF PRIORITY

This application makes reference to, incorporates the same herein, and claims all benefits accruing under 35 U.S.C. §119 from an application entitled A Logo Display Device For A Computer And The Method Thereof earlier filed in the Korean Industrial Property Office on the 9$^{th}$ day of September 1997, and there duly assigned Serial No. 97-46286, a copy of which is annexed hereto.

BACKGROUND OF THE INVENTION

1. Technical Field

The present invention relates to a logo display device for a computer and the method thereof, and more particularly to a logo display device for a computer and the method thereof which enables a user to optionally select and display a logo image in a computer's basic input output system (BIOS).

2. Related Art

Computer systems are information handling systems that are utilized by many individuals and businesses today. A computer system can be defined as a microcomputer that includes a central processing unit (CPU), a volatile memory, a non-volatile memory, a display monitor, a keyboard, a mouse, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

An image often referred to as a logo is stored in the computer's memory and is displayed through the display monitor when the computer system is turned on. This logo is also known as a sign-on logo. In a typical computer, the sign-on logo, which is determined and stored in the computer's memory is displayed on a screen every time the computer is turned on. Since the sign-on logo is fixed upon shipping the computer system, users have to see the fixed sign-on logo whenever powering on the system regardless of their desires. It is difficult for users to change the sign-on logo since a modification of memory is required.

Accordingly, in the typical computer system, users get easily tired of seeing the same sign-on logo all the time. Further, consumers such as companies or private individuals cannot make any changes to the previously made logo. For example, a sign-on logo cannot be changed to a computer producer's logo.

Exemplars of recent efforts in the art include U.S. Pat. No. 5,600,766 for a Method and Apparatus for Storing and Displaying a Power-on Graphical Image issued to Deckys, et al., U.S. Pat. No. 5,471,674 for a Computer System with Plug-in Override of System ROM issued to Stewart, et al. U.S. Pat. No. 5,522,076 for a Computer System Having BIOS (Basic Input/Output System)-ROM (Read Only Memory) Writing Function issued to Dewa et al., U.S. Pat. No. 5,619,639 for a Method and Apparatus for Associating an Image Display Area with an Application Display Area issued to Mast, and U.S. Pat. No. 5,355,489 for a Bios Load for a Personal Computer System Having a Removable Processor Card issued to Bealkowski et al.

While these recent efforts provide advantages, I note that they fail to adequately address how a sign-on logo can be easily, simply, and efficiently modified in a computer system.

SUMMARY OF THE INVENTION

It is an object of the present invention to provide a method of displaying a logo for a computer which allows various sign-on logos to be used by storing sign-on logos in a storage medium, and enables a common user to optionally select a sign-on logo after storing numerous logos in a read only memory (ROM).

To achieve the objects and in accordance with the purpose of the invention, as embodied and broadly described herein, the present invention comprises: an image exchange tool for changing numerous graphic images made by a user into logo images; a storage medium for storing the numerous logo images changed by means of the image exchange tool; a basic input output system read only memory (BIOS ROM) for storing default logo images; a logo image selection unit for enabling a user to optionally select a logo image among the logo images stored in the read only memory (ROM) and the storage medium; and a display unit for displaying the logo image selected optionally by the user.

In order to achieve the objects, a method is provided for displaying a logo in a computer. The method comprises the steps of: determining whether a logo to be displayed is preset to a default value; displaying the preset logo, if the logo to be displayed is preset to a default value; and selecting and displaying one of the logos set by a user, if the logo to be displayed is not preset to a default value.

To achieve these and other objects in accordance with the principles of the present invention, as embodied and broadly described, the present invention provides a computer apparatus displaying an image, comprising: an image exchange unit converting a graphic image into a logo image; a first storage unit being coupled to said image exchange unit and storing a plurality of available logo images converted by said image exchange unit; a second storage unit storing a default logo image; a logo image selection unit being coupled to said first and second storage units, and enabling a user to select a primary logo image from among said plurality of available logo images stored in said first storage unit and said default logo image stored in said second storage unit; and a display unit being coupled to said logo image selection unit and displaying said primary logo image selected by the user.

To achieve these and other objects in accordance with the principles of the present invention, as embodied and broadly described, the present invention provides a method of displaying a logo image on a computer apparatus by applying power to the computer apparatus, the method comprising the steps of: determining whether a logo image identifier corresponds to a default value; when said logo image identifier corresponds to said default value, displaying a default logo image; and when said logo image identifier does not correspond to said default value, selecting a new logo image from among a plurality of available logo images and then displaying said new logo image.

To achieve these and other objects in accordance with the principles of the present invention, as embodied and broadly described, the present invention provides a method of booting a computer apparatus by applying power to the computer apparatus, the method comprising the steps of: initializing a computer apparatus when said computer apparatus is powered on; displaying a new logo image stored in an auxiliary storage unit of said computer apparatus and not displaying a default logo image stored in a primary storage unit of said computer apparatus; and performing a booting routine.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
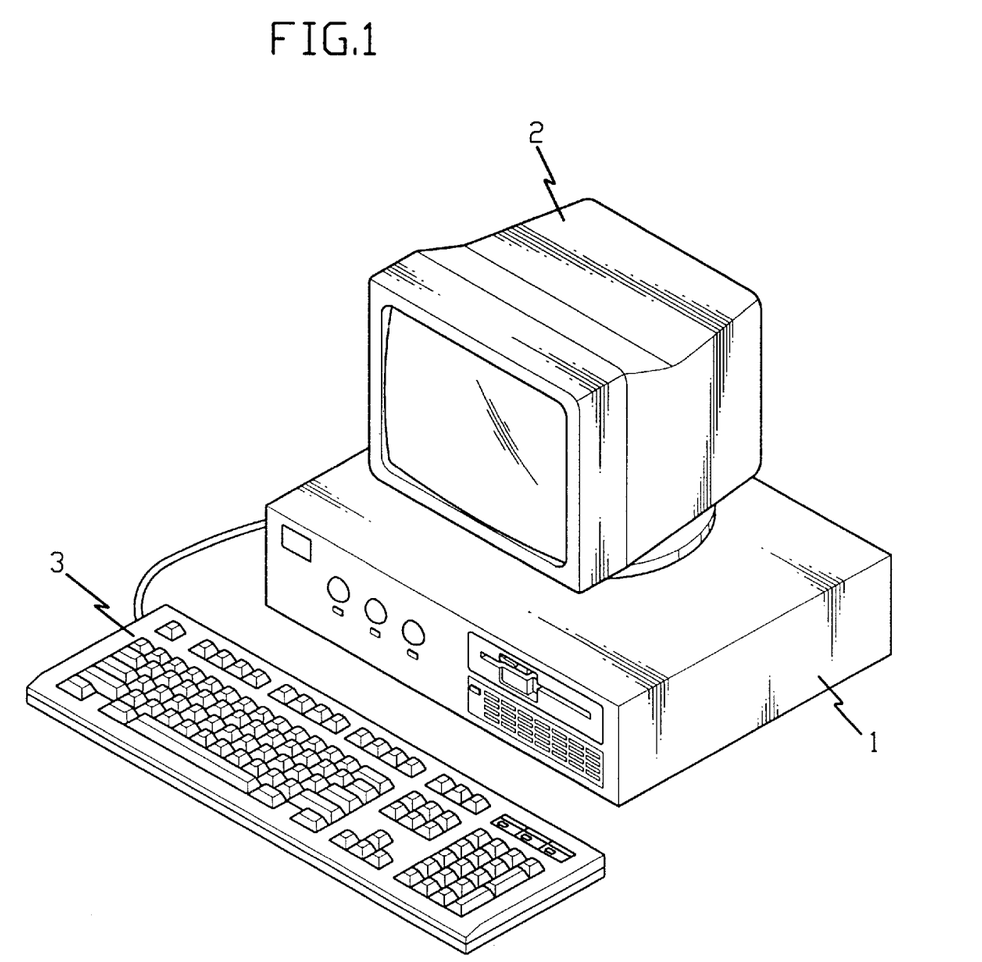
FIG. 1 is a perspective view of a computer.

Refer now to the drawings, and in particular to FIG. 1, which is a perspective view of a computer. As shown in FIG. 1, a desktop computer generally has a computer main body 1, a monitor 2 and a keyboard 3.

Figure 2:
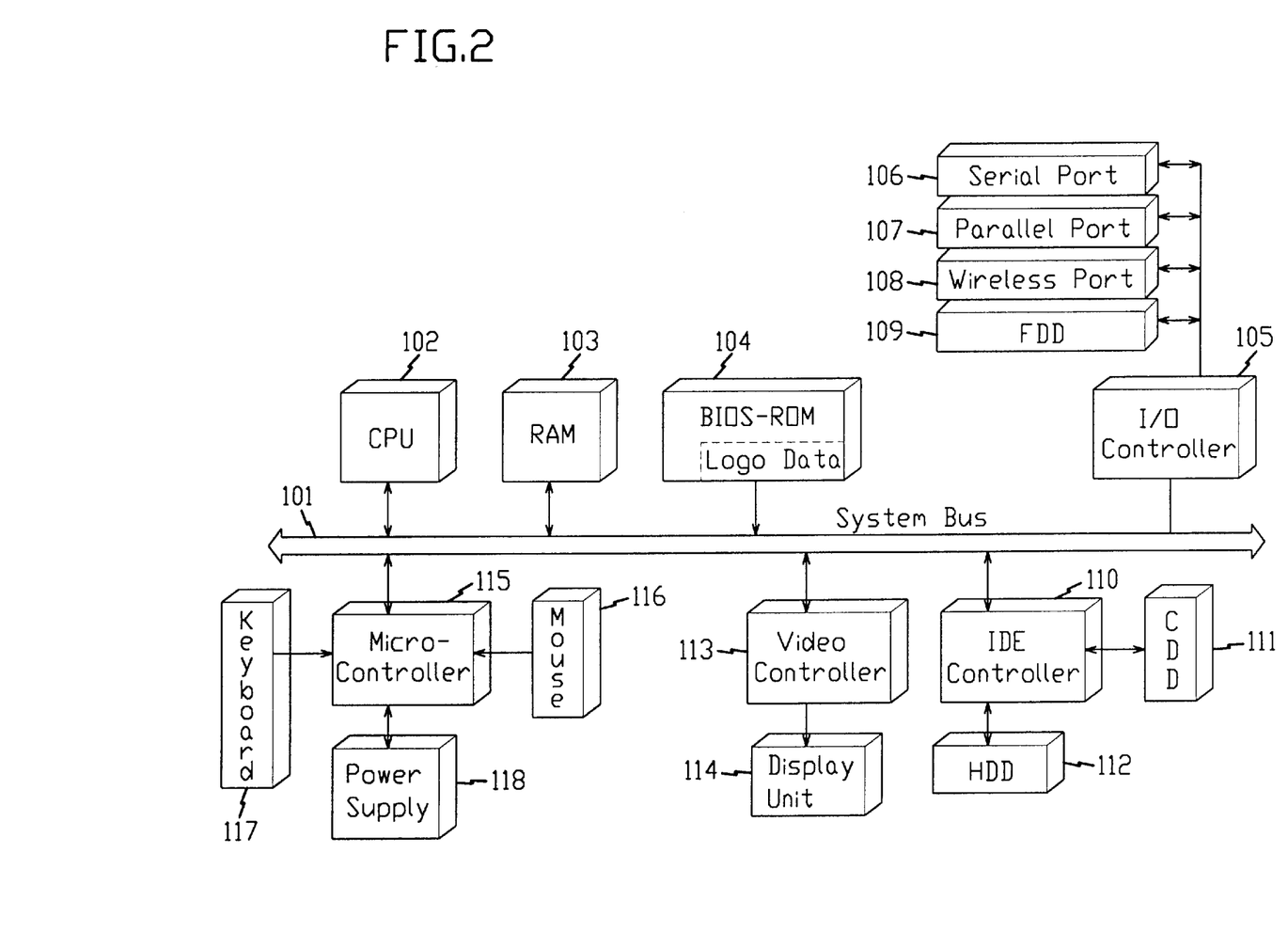
FIG. 2 is a block diagram of a computer system.

Refer now to FIG. 2, which is a block diagram of a computer system. This computer system comprises a system bus 101, a CPU (central processing unit) 102, RAM (random access memory) 103, a BIOS ROM (basic input output system read only memory) 104, an I/O (input/output) controller 105, a serial port 106, a parallel port 107, a wireless port 108, a FDD (floppy disk driver) 109, an IDE (integrated device electronics) controller 110, a CDD (compact disk driver) 111, a HDD (hard disk driver) 112, a video controller 113, a display unit 114, a micro-controller 115, a mouse 116, a keyboard 117 and a power supply 118. The basic input output system read only memory (BIOS ROM) 104 has logo data to be displayed, so that a logo is displayed through the display unit 114 such as a monitor upon booting the computer system.

The computer system displays a sign-on logo in a system's basic input output system (BIOS) while performing a POST (power on self test). At this time, because the sign-on logo has been stored in the read only memory (ROM) 104 ever since the shipment of the computer product, the same sign-on logo is always displayed on a screen whenever the user powers on the computer.

In order to display the sign-on logo, the following two methods have been proposed: first, a method for replacing a text font with a logo graphic data in a text mode while performing a system power on self test (POST); second, a method for storing a logo graphic data in a read only memory (ROM) in a graphic mode.

For the typical computer, the sign-on logo, which is determined and stored in the read only memory (ROM) upon making a basic input output system (BIOS), is displayed on a screen all the time. Thus, other sign-on logos cannot be used before changing the sign-on logo of the read only memory (ROM) image. Namely, since the sign-on logo is fixed upon shipping the system, users have to see the fixed sign-on logo whenever powering on the system regardless of their desires. The sign-on image may be changed by changing a read only memory (ROM) image. However, it is difficult for common users to change the sign-on image since the revision of the basic input output system (BIOS) is required.

Accordingly, in the typical computer system, users get easily tired of seeing the same sign-on logo all the time. Further, consumers such as companies or private individuals cannot make any changes to the previously made logo, for example, to a computer producer's logo which a company is used to inserting when producing a personal computer system.

Figure 3:
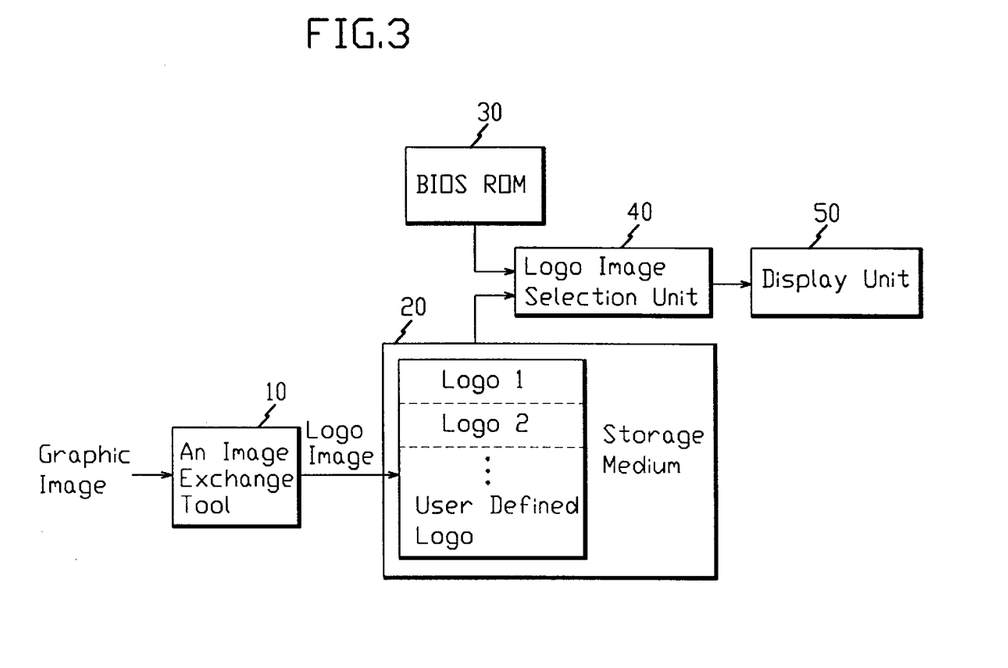
FIG. 3 is a block diagram of a logo display device for a computer, in accordance with the principles of the present invention.

Preferred embodiments of the present invention will become apparent from a study of the following detailed description with reference to the accompanying drawings. Refer now to FIG. 3, which is a block diagram of a logo display device for a computer, in accordance with the principles of the present invention. In FIG. 3, a logo display device in a computer in accordance with embodiments of the present invention comprises an image exchange tool 10, a storage medium 20, a basic input output system read only memory (BIOS ROM) 30, a logo image selection unit 40 and a display unit 50.

Figure 5:
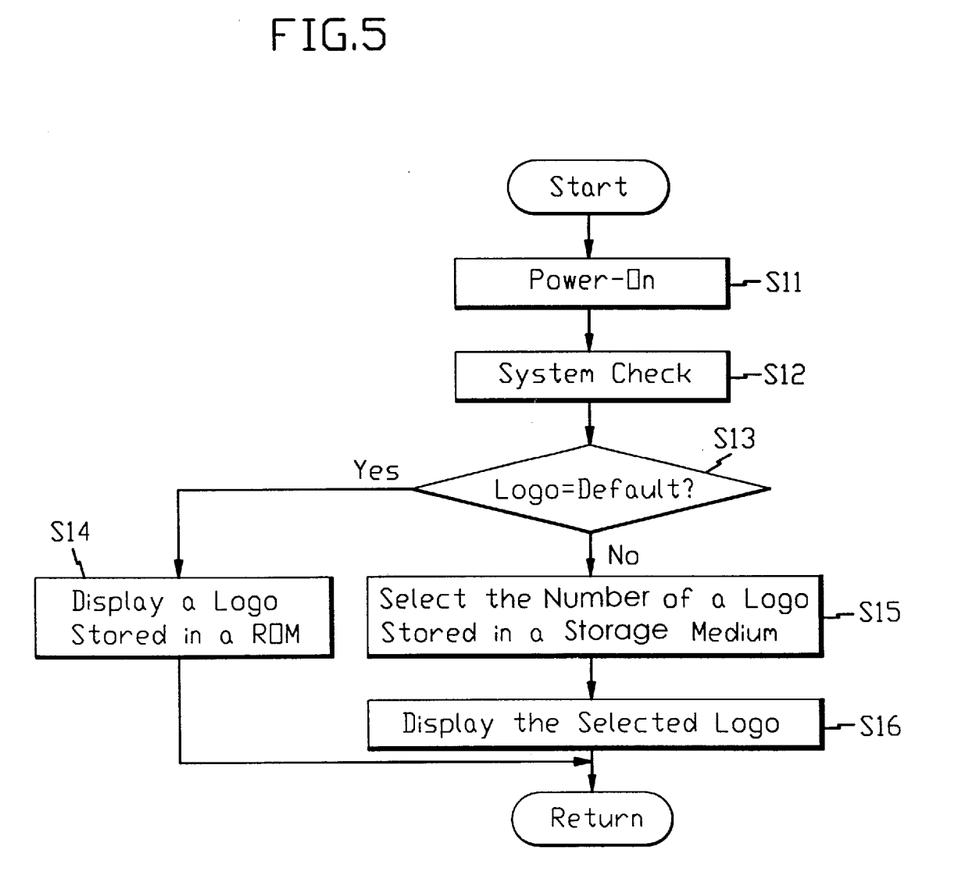
FIG. 5 is a flow chart showing a method of displaying a logo in a computer, in accordance with a first embodiment of the present invention.

Refer now to FIG. 5, which is a flow chart showing a method of displaying a logo in a computer, in accordance with a first embodiment of the present invention. In FIG. 5, a method of displaying a logo in a computer in accordance with a first embodiment of the present invention comprises the following steps. At step S11, a computer system is powered on. At step S12, a computer system is checked to determine if it is in a normal state. At step S13, a determination is made to identify whether a loaded logo number is set to a default value. At step S14, when the logo number is set to a default value, a sign-on logo is displayed in a read only memory (ROM). At step S15, when the logo number is not set to a default value, one of the logos stored in a storage medium is selected. At step S16, the selected sign-on logo is displayed.

Figure 8:
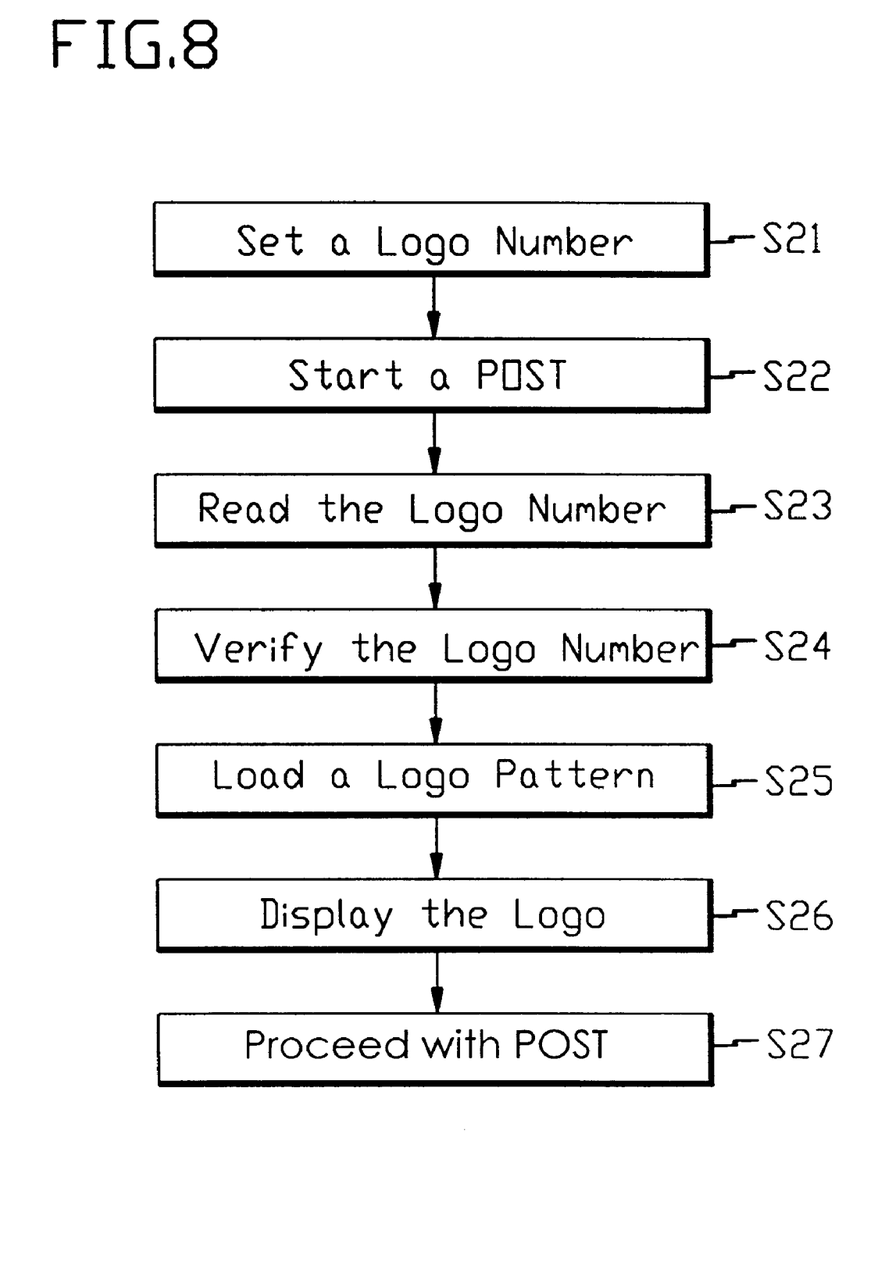
FIG. 8 is a flow chart showing a method of displaying a logo in a computer, in accordance with a second embodiment of the present invention.

Refer now to FIG. 8, which is a flow chart showing a method of displaying a logo in a computer, in accordance with a second embodiment of the present invention. In FIG. 8, a method of displaying a logo in a computer in accordance with a second embodiment of the present invention comprises the following steps. At step S21, setting a sign-on logo number when the system is powered on. At step S22, starting a power on self test (POST). At step S23, reading the set sign-on logo number. At step S24, verifying the sign-on logo number. At step S25, loading a pattern of the verified sign-on logo or making a newly compounded pattern by using an existing sign-on logo pattern. At step S26, displaying the loaded sign-on logo pattern or the compounded sign-on logo pattern, in accordance with the result of step S25. At step S27, proceeding with the power on self test (POST) after displaying the sign-on logo.

The operation of the logo display device in a computer and the method thereof in accordance with the embodiment of the present invention is as follows. As shown in FIG. 3, in the logo display device in the computer, various graphic images made by a user are first changed into sign-on logo images by means of the image exchange tool 10, and then are stored in the storage medium 20. In other words, graphic files made by the user can be exchanged to images to be used as sign-on logos, and the images changed into sign-on logos are stored in a user-defined sign-on logo position of the storage medium 20.

Then, the user optionally selects and outputs a sign-on logo among the numerous logos stored as user-defined logos in the storage medium 20 or among the sign-on logos stored in the basic input output system read only memory (BIOS ROM) 30. The numerous logos stored as user-defined logos can be denoted by names such as logo 1, logo 2, and logo n, where n is a number. In addition, the logo image selection unit 40 allows the user to optionally select a logo image among logo images stored in the storage medium 20 and the basic input output system read only memory (BIOS ROM) 30. Here, the logo image can be selected by means of a setup program. The display unit 50 of FIG. 3 outputs the logo image selected by the user.

Figure 6:
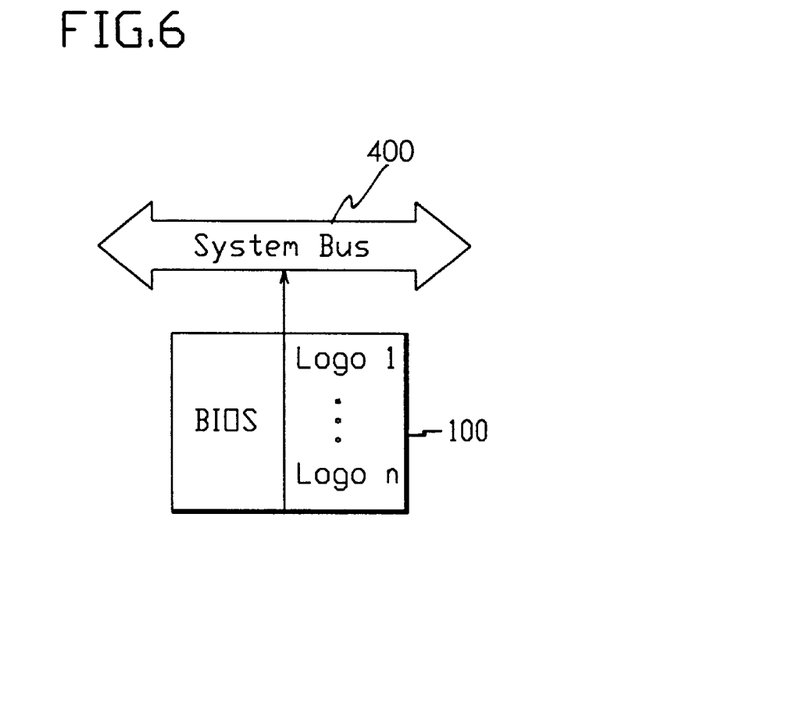
FIG. 6 illustrates the storage of a basic input output system (BIOS) and logos in a read only memory (ROM) and a method of displaying a logo in a computer, in accordance with a second embodiment of the present invention.
Figure 7:
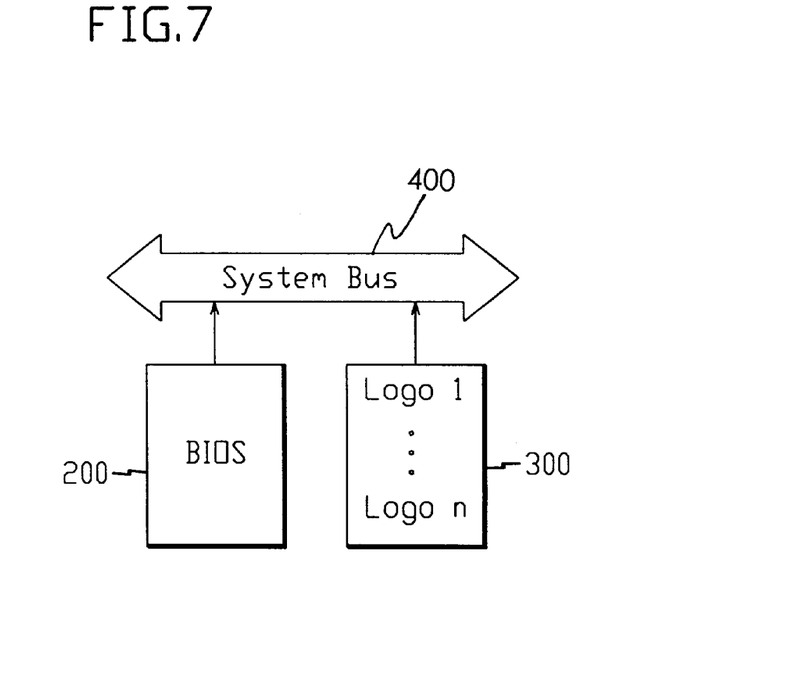
FIG. 7 illustrates the storage of logos in an additional read only memory (ROM) and a computer logo display method, in accordance with a second embodiment of the present invention.

On the other hand, numerous logo images can be stored additionally in a basic input output system read only memory (BIOS ROM), and another read only memory (ROM) which stores numerous logo images can be mounted additionally. Refer now to FIG. 6, which illustrates the storage of a basic input output system (BIOS) and logos in a read only memory (ROM) and a method of displaying a logo in a computer, in accordance with a second embodiment of the present invention. Also refer to FIG. 7, which illustrates the storage of logos in an additional read only memory (ROM) and a computer logo display method, in accordance with a second embodiment of the present invention. In FIG. 6, numerous logos are stored in the basic input output system read only memory (BIOS ROM) 100 connected to a system bus 400. In FIG. 7, numerous logos are stored in a read only memory (ROM) 300 mounted additionally from the shipment of the computer product, so that the user can optionally select and output one of the numerous logos. In FIG. 7, the read only memory 300 and the separate basic input output system 200 are connected to a system bus 400.

Figure 4:
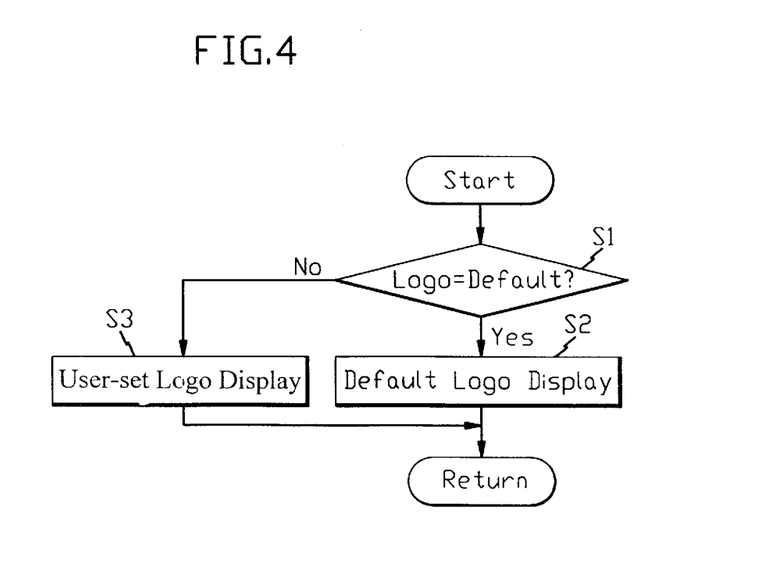
FIG. 4 is a flow chart showing a method of displaying a logo in a computer, in accordance with the principles of the present invention.

Refer now to FIG. 4, which is a flow chart showing a method of displaying a logo in a computer, in accordance with the principles of the present invention. Referring to FIG. 4, a method of displaying a logo in computer is as follows. At step S1, it is determined whether a logo to be displayed is preset to a default value. At step S2, when the logo to be displayed is preset to default value, the preset logo is displayed. At step S3, when the logo to be displayed is not preset to a default value, one logo is selected and displayed among the logos set by the user.

In other words, a logo stored in a primary storage unit is displayed when the logo to be displayed is preset to a default value, as in step S2. Alternatively, one logo is selected and outputted among more than one logo stored in a secondary storage unit when the logo to be displayed is not preset to a default value, as in step S3. Here, the primary storage unit refers to a basic input output system read only memory (BIOS ROM), and the secondary storage unit refers to an auxiliary storage such as a hard disk drive. The graphic images made by the user are included in the logos stored in the secondary storage unit.

Refer again to FIG. 5. At step S11, the system is powered ON. At step S12, whether the computer system is in a normal state is checked. At step S13, it is determined whether a loaded sign-on logo number is set to a default value. At step S14, when the logo number is set to a default value, a sign-on logo stored in a read only memory (ROM) is displayed. At step S15, when the sign-on logo is not set to a default value, a logo number stored in a storage medium is selected. At step S16, the logo corresponding to the selected logo number is displayed. Namely, certain portions of the storage medium is allocated for storing sign-on logos. The storage medium can store not only user-defined logos but also various logos.

For example, upon an initial use of a computer purchased by a user, a sign-on logo of a default value is used. At an initial setup, it is selected whether a basic sign-on logo in a read only memory (ROM), or an image in a storage medium, that is, a logo image changed from a graphic image made by the user is to be displayed. Namely, the user is allowed to select and to use a logo through an initial setup menu.

In other words, a basic sign-on logo stored in a read only memory (ROM) is displayed on the screen upon running the system for the first time after the shipment of the computer product. However, in the case that the user wants to display other logos rather than the basic sign-on logo, the user may get into the initial setup and select one of the various sign-on logos. Then, the selected sign-on logo is displayed on a screen.

Consequently, a sign-on logo can be stored in a storage medium rather than a read only memory (ROM). Further, numerous sign-on logos are stored in a storage medium so that various sign-on logos can be displayed on a screen. In addition, the image of the sign-on logo can be changed without upgrading the basic input output system read only memory (BIOS ROM) since the image of the sign-on logo is stored in the storage medium.

Refer again to FIG. 8. At step S21, when the power is turned ON, a sign-on logo number is set. At step S22, a power on self test (POST) is started. Namely, if the user wants to replace the sign-on logo of default value with another sign-on logo, the user selects a wanted sign-on logo by using a utility program capable of changing an initial setup or a complementary metal oxide semiconductor (CMOS) value. At step S23, the number of the set sign-on logo is read. At step S24, the number of the sign-on logo is verified. At step S25, the pattern of the verified sign-on logo is loaded, or a newly compounded pattern is made by using the existing sign-on logo pattern.

Thus, when the user selects the number of the wanted logo at an initial setup and then reboots the system, a pattern of the selected logo or a newly compounded pattern is loaded whereby basic input output system (BIOS) routines for displaying the selected logo is performed. Accordingly, sign-on logo display routines load a corresponding logo from the read only memory (ROM), or make a desired pattern by compounding a few patterns, after checking the logo number selected by the user. At step S26, the loaded or compounded sign-on logo pattern is displayed. At step S27, the power on self test (POST) is continued.

Refer again to FIGS. 6 and 7, which are exemplary constructions of a basic input output system read only memory (BIOS ROM) upon loading numerous sign-on logos, showing the storage of plural logo pattern. Here, FIG. 6 illustrates the use of one read only memory (ROM) 100, and FIG. 7 illustrates the use of at least two read only memories (ROMs) 200, 300 of which one read only memory (ROM) 300 stores sign-on logos.

The effect of the present invention lies in that various sign-on logos are provided in addition to a basic sign-on logo, so that a common user can display logos on a screen as the user wants to. Moreover, the present invention simplifies the change of a sign-on logo by storing sign-on logos in a storage medium, when compared to the typical way of changing a sign-on logo by upgrading the basic input output system (BIOS).

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer apparatus displaying a logo image when the computer apparatus is powered on, comprising:
    an image exchange unit converting first images into converted logo images;
    a first storage unit being coupled to said image exchange unit and storing a first plurality of logo images corresponding to said converted logo images;
    a second storage unit storing a default logo image and a second plurality of logo images, said second storage unit corresponding to a basic input output system read only memory;
    a logo image selection unit being coupled to said first and second storage units, selecting one logo image in accordance with a choice of a user, the user choosing said one logo image from among said first plurality, said second plurality, and said default logo image when said computer apparatus is powered on and before a power on self test of said computer apparatus is completed, said selected logo image not being written to said second storage unit when said selected logo image is selected from among said first plurality of images stored in said first storage unit; and
    a display unit being coupled to said logo image selection unit, said display unit displaying said selected primary logo image when said computer apparatus is powered on and before the power on self test of said computer apparatus is completed;
    said first plurality of logo images, said second plurality of logo images, said default logo image, and said converted logo images corresponding to logo images which can be displayed by said computer apparatus when said computer apparatus is powered on and before the power on self test of said computer apparatus is completed.

2. The apparatus of claim 1, said first plurality of logo images being preset by a user.

3. The apparatus of claim 2, said default logo image being displayed by said display unit when the user does not choose a logo image.

4. The apparatus of claim 3, said first storage unit corresponding to a memory unit selected from among said basic input output system read only memory unit, a hard disk drive, and an additional read only memory unit distinguishable from said basic input output system read only memory unit.

5. The apparatus of claim 1, said second storage unit storing a logo image set by a user in addition to said default logo image and said second plurality of logo images.

6. The apparatus of claim 1, said first storage unit corresponding to a hard disk drive.

7. The apparatus of claim 1, said choosing of the logo image being in accordance with an initial setup routine of said logo image selection unit.

8. The apparatus of claim 1, said first storage unit corresponding to a read only memory unit distinguishable from said second storage unit.

9. A method of displaying a logo image on a computer apparatus when the computer apparatus is powered on, the method comprising the steps of:
    when said computer apparatus is powered on and before a power on self test of said computer apparatus is completed, determining whether a logo image identifier corresponds to a default value;
    when said logo image identifier corresponds to said default value, displaying a default logo image stored in a basic input output system read only memory; and
    when said logo image identifier does not correspond to said default value, displaying a new logo image selected by a user from among a first plurality of logo images stored in a storage medium, said storage medium being distinguishable from said basic input output system read only memory;
    said displaying being performed when said computer apparatus is powered on and before the power on self test of said computer apparatus is completed;
    said default logo image, said new logo image, and said first plurality of logo images corresponding to logo images which can be displayed by said computer apparatus when said computer apparatus is powered on and before the power on self test of said computer apparatus is completed.

10. The method of claim 9, said first plurality of logo images being preset by a user, said first plurality of logo images corresponding to a plurality of graphic images formed by a user and converted to said first plurality of logo images, said graphic images not being logo images.

11. The method of claim 9, further comprising:
    when said logo image identifier corresponds to said default value, displaying a first logo image from among a second plurality of logo images stored in said basic input output system read only memory.

12. The method of claim 11, said new logo image not being written to said basic input output system read only memory.

13. The method of claim 11, said new logo image not being written to said basic input output system read only memory when said new logo image is selected from said images stored in said storage medium.

14. A method of booting a computer apparatus by applying power to the computer apparatus, the method comprising the steps of:
    starting a power on self test of said computer apparatus when said computer apparatus is powered on;
    before the power on self test is completed, selectively choosing a new logo image stored in an auxiliary storage unit of said computer apparatus, said choosing corresponding to a user choosing said new logo image from among a first plurality of logo images stored in said auxiliary storage unit;
    when said new logo image is chosen, displaying said new logo image and not displaying a default logo image stored in a primary storage unit of said computer apparatus, and not writing said new logo image to said primary storage unit; and completing the power on self test;

said default logo image and said new logo image corresponding to logo images which can be displayed by said computer apparatus when said computer apparatus is powered on and before the power on self test of said computer apparatus is completed.

15. The method of claim 14, said primary storage unit corresponding to a basic input output system read only memory unit of said computer apparatus.

16. The method of claim 15, said auxiliary storage unit corresponding to a hard disk drive of said computer apparatus storing an operating system routine of said computer apparatus.

17. The method of claim 15, said auxiliary storage unit corresponding to a read only memory unit distinguishable from said basic input output system read only memory unit of said computer apparatus.

18. The method of claim 14, said auxiliary storage unit corresponding to a storage unit selected from among a read only memory unit, an external hard disk, a floppy disk, a compact disk, an internal hard disk, and a removable cartridge hard disk.

19. The method of claim 14, said default logo image being displayed before the power on self test is completed when the user does not choose said new logo image.

20. The method of claim 14, said first plurality of logo images being preset by the user.

21. A computer apparatus displaying a logo image when the computer apparatus is powered on, comprising:

at least one storage unit storing a plurality of available logo images and a default logo image;

a logo image selection unit being coupled to said at least one storage unit, said logo image selection unit enabling a user to select a primary logo image from among said plurality of available logo images and said default logo image, said logo image selection unit enabling the user to perform said selecting of said primary logo image when said computer apparatus is powered on and before a power on self test of said computer apparatus is completed; and a display unit displaying said primary logo image selected by the user before the power on self test is completed;

said at least one storage unit further comprising:

a first storage unit storing said plurality of available logo images; and a second storage unit corresponding to a first read only memory, said second storage unit storing said default logo image, said first and second storage units being distinguishable from each other.

22. The apparatus of claim 21, said plurality of available logo images being preset by a user, said first read only memory corresponding to a basic input output system read only memory.

23. The apparatus of claim 21, said first storage unit corresponding to one selected from among said first read only memory, a hard disk drive, and an auxiliary read only memory.

24. A method, comprising:

powering on a computer apparatus and starting a power on self test of said computer apparatus;

selectively choosing a new logo image before the power on self test of said computer apparatus is completed, said new logo image being stored in an auxiliary storage unit of said computer apparatus;

when said new logo image is chosen, displaying said new logo image before the power on self test of said computer apparatus is completed, not displaying a default logo image stored in a primary storage unit of said computer apparatus, and not writing said new logo image to said primary storage unit.

25. The method of claim 24, said primary storage unit corresponding to a basic input output system read only memory unit of said computer apparatus.

26. The method of claim 25, said auxiliary storage unit corresponding to a read only memory unit distinguishable from said basic input output system read only memory unit of said computer apparatus.

27. The method of claim 25, said auxiliary storage unit corresponding to storage unit selected from among a read only memory unit, an external hard disk, a floppy disk, a compact disk, an internal hard disk, and a removable cartridge hard disk.

28. The method of claim 25, said choosing of said new logo image corresponding to choosing said new logo image from among a plurality of available logo images stored in said auxiliary storage unit.

29. The method of claim 24, said primary storage unit corresponding to a primary hard disk drive of said computer apparatus.

30. The method of claim 29, further comprising storing an operating system routine of said computer apparatus in said primary storage unit.

31. The method of claim 30, said auxiliary storage unit corresponding to a read only memory unit distinguishable from a basic input output system read only memory unit of said computer apparatus.

32. The method of claim 30, said auxiliary storage unit corresponding to storage unit selected from among a read only memory unit, an external hard disk, a floppy disk, a compact disk, an internal hard disk, and a removable cartridge hard disk.

33. The method of claim 30, said choosing of said new logo image corresponding to a user choosing said new logo image from among a plurality of available logo images stored in said auxiliary storage unit.

34. The method of claim 33, further comprising:

when the user does not choose said new logo image, displaying said default logo image stored in said primary storage unit of said computer apparatus before the power on self test is completed.

* * * * *

UNITED STATES PATENT AND TRADEMARK OFFICE
CERTIFICATE OF CORRECTION

| | |
|---|---|
| PATENT NO. | : 6,269,441 B1 |
| APPLICATION NO. | : 09/150101 |
| DATED | : July 31, 2001 |
| INVENTOR(S) | : Gwang-Soo Lee and Hyun-Kook Lee |

Page 1 of 1

It is certified that error appears in the above-identified patent and that said Letters Patent is hereby corrected as shown below:

On the Title Page, at the end of the section identified as Item "(*) Notice:", please delete "This patent is subject to a terminal disclaimer."

Signed and Sealed this

Twenty-seventh Day of April, 2010

David J. Kappos
*Director of the United States Patent and Trademark Office*